(12) United States Patent
Boll et al.

(10) Patent No.: US 7,575,623 B2
(45) Date of Patent: Aug. 18, 2009

(54) METHOD FOR LEACHING ALUMINIUM-METAL ALLOYS

(75) Inventors: Matthias Boll, Köln (DE); Stephan Völkening, Köln (DE)

(73) Assignee: Bayer Technology Services GmbH, Leverkusen (DE)

( * ) Notice: Subject to any disclaimer, the term of this patent is extended or adjusted under 35 U.S.C. 154(b) by 740 days.

(21) Appl. No.: 10/886,239

(22) Filed: Jul. 7, 2004

(65) Prior Publication Data

US 2005/0006254 A1 Jan. 13, 2005

(30) Foreign Application Priority Data

Jul. 7, 2003 (DE) ................. 103 30 636

(51) Int. Cl.
C22B 21/02 (2006.01)
C22B 3/12 (2006.01)
C22B 3/16 (2006.01)
G01N 27/26 (2006.01)
B01J 25/04 (2006.01)

(52) U.S. Cl. .................. 75/743; 205/790; 502/301; 502/355

(58) Field of Classification Search .......... 75/743; 205/790; 502/301, 355
See application file for complete search history.

(56) References Cited

U.S. PATENT DOCUMENTS 3,201,282 A * 8/1965 Eduard et al. ............. 429/13
3,578,505 A * 5/1971 Rogers et al. ............. 502/101
3,673,116 A * 6/1972 Richter .................. 502/300
3,715,238 A * 2/1973 Mayell et al. ............. 502/101
4,024,044 A * 5/1977 Brannan et al. ........... 204/242
4,169,025 A * 9/1979 Needes ................... 205/534
5,035,790 A * 7/1991 Morimoto et al. ....... 204/290.04
5,367,112 A * 11/1994 Franczyk ................. 562/526
5,595,642 A * 1/1997 Xue et al. ................ 205/591
5,785,808 A 7/1998 Litschert, II et al.
2008/0194401 A1* 8/2008 Schmidt ................. 502/337

FOREIGN PATENT DOCUMENTS

| CH | 495775 A | 9/1970 |
| EP | 0 352 727 | 1/1990 |
| EP | 0 359 432 | 3/1990 |
| EP | 0 772 017 | 5/1997 |
| FR | 1 119 126 | 6/1956 |

(Continued)

OTHER PUBLICATIONS

Choquette et al., "In Situ Activation of the Raney-Ni Composite-Coated Electrode for the Hydrogen Evolution Reaction", Int. J. Hydrogen Energy, vol. 15, No. 8, pp. 551-555, 1990.*

(Continued)

*Primary Examiner*—George Wyszomierski
*Assistant Examiner*—Tima M McGuthry-Banks

(57) ABSTRACT

A method is described of treating aluminium-metal alloys with organic or inorganic bases by exposing them to an aqueous solution of the base, removing the aqueous base and washing the treated alloy material, the leaching process being monitored, during the time of exposure to the base, on the basis of the potential which is established at a measuring electrode as a result of the treated aluminium-metal alloy and the hydrogen which may be formed during the reaction.

19 Claims, 2 Drawing Sheets

FOREIGN PATENT DOCUMENTS

| | | | |
|---|---|---|---|
| JP | 360185362 A | * | 9/1985 |
| WO | WO 99/54017 | | 10/1999 |
| WO | WO 01/39856 | | 6/2001 |
| ZA | 8907612 A | * | 3/1991 |

OTHER PUBLICATIONS

Choquette Y. et al, "Leaching of Raney Nickel Composite-Coated Electrodes"; Journal of Applied Electrochemistry, vol. 20, 1990, pp. 855-863 (XP002300164).

The European Search Report issued Oct. 25, 2004 is attached.

The International Search Report issued Oct. 22, 2004 is attached.

A.J. Smith, et al., "Kinetics and mechanism of the preparation of Raney® copper", Journal of Applied Electrochemistry, vol. 29, 1999, pp. 1085-1094.

Uwe Kúrschner, et al., Catalysis Letters, 34 1995, pp. 191-199.

S. Nishimura, et al., "Bayerite-promoted caustic leaching of single phase $NiAl_3$ and $Co_2 Al_9$ alloys to produce highly active Raney nickel and Raney cobalt catalysts", Applied Catalysis, vol. 76, 1991, pp. 19-29.

Vassant R. Choudhary, "Leaching of Raney Ni Al Alloy with Alkali", J. Chem. Tech., vol. 33A, 1983, 339-349.

A.J. Smith, et al., Journal of Applied Electrochemistry, vol. 30, 2000, pp. 1097-1102.

J. Pardillos-Guindet, et al., Electrode Potential of a Dispersed Raney Nickel Electrode during Acetone Hydrogenation, Journal of Catalysis, vol. 155, 1995, pp. 12-20.

D.J. Young, et al., Raney-Nickel-Copper Catalysts, I. Structure and Leaching Properties, Journal of Catalyst, vol. 64, 1980, pp. 116-123.

* cited by examiner

METHOD FOR LEACHING ALUMINIUM-METAL ALLOYS

The invention relates to a process for treating aluminium-metal alloys with organic or inorganic bases by exposing them to an aqueous solution of the base, removing the aqueous base and washing the treated alloy material.

Leaching of Raney alloys (aluminium-containing alloys with major proportions of, for example, nickel or copper with possible further additions of metals, e.g. subgroup elements such as iron) is carried out on an industrial scale by introducing the alloy into caustic potash solution or caustic soda solution of various concentrations. With stirring and possible refluxing, aluminium is dissolved from the alloy with the formation of hydrogen. The invention described here demonstrates a method via which said leaching process can be monitored online via an electrochemical measurement. This allows the leaching operation to be stopped at a desired degree of leaching determined via said method or allows reliable determination of the designated end point of the leaching operation.

The present invention relates especially to electrochemical monitoring, using simple equipment, of the leaching operation of Raney alloys. Such alloys, among which the nickel and copper alloys are to be mentioned in particular, are converted by the leaching treatment and the at least partial dissolution of the aluminium entailed thereby, into active catalysts which are used worldwide on a large scale, for example, in the hydrogenation by means of gaseous or dissolved hydrogen of many different chemical compounds. Simple methods of reliably measuring the leaching process are not described in the literature.

During the leaching operation, the degree of leaching plays a major role, as has been known in the literature for quite some time. For example, the activity of leached aluminium-nickel and aluminium-cobalt alloys as heterogeneous catalysts in the hydrogenation of cyclohexanone, naphthalene and benzene exhibits a significant dependence on the degree of leaching (S. Nishimra. et al., Appl. Cat. 76 (1991), 19-29).

The leaching reaction in principle proceeds so rapidly that classic elemental analysis of samples drawn from the reaction vessel is not suitable. Given that the grade of the alloy used for leaching often fluctuates in practice (important factors in this context include the grain sizes used, with respect to the leaching rate, and the composition of the material after leaching is complete, V. R. Choudhary et al., J. Chem. Tech. Biotechnol. 33A (1983), 339-349), a simple, in-situ analytical method that is stable even under the aggressive reaction conditions would seem to make sense, however.

The indirect measurement, carried out on an individual basis, via the generation of hydrogen is helpful only up to a point, since the leached alloy absorbs unknown quantities of hydrogen, which means that only a rough estimate of the leached aluminium fraction can be made (see also D. J. Young et al., J. of Cat. 64 (1980), 116-123). In addition, large errors can occur if the alloy contains substantial amounts of unreacted aluminium.

The (partially incomplete) leaching process and the kinetics that proceed during leaching have previously been studied at a number of locations (e.g. by D. J. Young et al., J. of Cat. 64; (1980), 116-123 and V. R. Choudhary et al., J. Chem. Tech. Biotechnol., 33A (1983), 339-349). In both cases, the generation of hydrogen was used as a monitor for the progress of the leaching operation. Chemical analyses of the alkali after the leaching process have also been described in the prior art. Using electrochemical methods (RDE=Rotating Disc Electrode), short pieces of Raney copper rods were examined, for example, in order to determine the kinetic and structural progress of the leaching process (A. J. Smith et al., J. of Appl. Electrochem. 29 (1999), 1085) or in order to study the addition of chromate and the effect of leaching on this system (A. J. Smith et al., J. of Appl. Electrochem. 30 (2000), 1097).

Reliable monitoring of the leaching operation in situ, particularly without sampling, as is the object of the invention, has not been described until now.

This object is achieved, according to the invention, by measuring the potential of an electrode which preferably comprises a gold sheet ("pick-up electrode") and which is immersed into the reactor in which the leaching of an aluminium-metal alloy, particularly a Raney alloy, by alkali takes place and in which in addition frequent contact between the finely dispersed metal being formed and the pick-up electrode is ensured, in particular, by intensive stirring of the suspension. The difference in potential between the pick-up electrode and a reference electrode, which is likewise conductively connected to the reactor, preferably via a salt bridge, is recorded as a function of time and changes as the degree of leaching increases.

The present invention relates to a method of treating aluminium-metal alloys with organic or inorganic bases, especially alkali metal carbonate or alkali metal hydroxide, particularly preferably sodium hydroxide or potassium hydroxide, by exposing them (leaching) to an aqueous solution of the base, at a temperature of, in particular, up to 100° C., preferably from 20 to 100° C. optionally under an inert gas atmosphere, removing the aqueous base and washing the treated alloy material, characterized in that during the time of exposure to the base the leaching process is monitored with the help of the difference in potential between a measuring electrode (pick-up electrode), which is immersed in the process mixture, and a reference electrode and the processes is terminated when a specified difference in potential (corresponding to a desired composition of the treated alloy) is reached.

This method thus allows the controlled termination of a leaching operation in order to establish a desired property of the product.

The general method of measuring electrochemical potentials at, for example, gold or platinum pick-up electrodes or at pick-up electrodes made of other materials is generally known and is widely used (compare e.g. J. Pardillos-Guindet, J. of Catalysis 155, (1995), 12-20 or U. Kürschner et al., Catalysis Letters 34, (1995), 191-199).

During leaching, the aluminium is dissolved from the alloy, particularly with generation of hydrogen. The solution therefore preferably contains dissolved and gaseous hydrogen in addition to metal particles from the starting alloy.

In a preferred embodiment, the reference electrode is connected electroconductively to the reactor solution and is particularly preferably located outside the reactor. The reference electrode is thus intended to be independent of the leaching temperature and to supply a potential that is constant over time.

The reference electrode used is preferably an electrode of the second type. "Electrode of the second type" in this context means an electrode type showing a time—independent and reproducible electrochemical potential, e.g. the Silver/Silver-chloride, so-called "Argental" electrode or the Quicksilver/Quicksilver(1) chloride electrode, the so-called "Kalomel" electrode.

The metal of the aluminium-metal alloy is preferably selected from the group consisting of nickel, copper, cobalt, the metal being present alone or in a mixture.

The ratio of the proportions by weight of aluminium to metal in the starting alloy is preferably from 50:50 to 20:80.

The proportion by weight of aluminium in the starting alloy is particularly preferably from 5 to 95 wt %, preferably from 15 to 80 wt %.

In a preferred embodiment of the invention, the starting alloy can include as a minor component a metal from the group consisting of iron, cerium, vanadium, niobium, tantalum, chromium, molybdenum or manganese alone or in a mixture.

The time of exposure to the base is preferably in the range from a number of seconds up to a number of days, particularly preferably in the range from 10 minutes to 2 hours.

The potential of the alloy particles depleted in aluminium changes as leaching progresses. Particularly as a result of the suspension being stirred, the alloy particles will hit e.g. the pick-up electrode. In the process, the potential of the latter changes in the direction of equalization with the potential of the alloy particles. Consequently, the potential of the pick-up electrode will likewise change as leaching proceeds. Following a calibration, leaching can be monitored quantitatively, in situ and online.

In a preferred procedure, the reaction mixture is therefore stirred during the leaching operation.

Likewise advantageous is a particularly preferred method, characterized in that the pick-up electrode is disposed transversely to the principal flow direction of this solution in the reactor.

Particularly preferably, the measuring electrode is loaded with metal particles formed during the leaching operation.

Particularly suitable as a pick-up electrode is an inert metal such as gold, since very often no further chemical processes that might affect the potential will occur on this metal. The measuring electrode is therefore preferably made from a chemically inert metal, particularly from gold, preferably in the form of sheet, wire or mesh.

Particularly preferred is an embodiment of the method in which the pick-up electrode surface area covered by the solution is at least 10 times, preferably at least 100 times greater than the mean surface area of the alloy particles.

The invention also relates to the use of the product derived from the method according to the invention, as a catalyst, preferably as a hydrogenation catalyst.

BRIEF DESCRIPTION OF THE DRAWINGS

The invention is explained below in more detail with reference to the figures by means of the example, without, however, thereby limiting the scope of the invention.

In the figures.

EXAMPLE

Electrochemical Measurement of the Leaching of Raney Nickel

Figure 1:
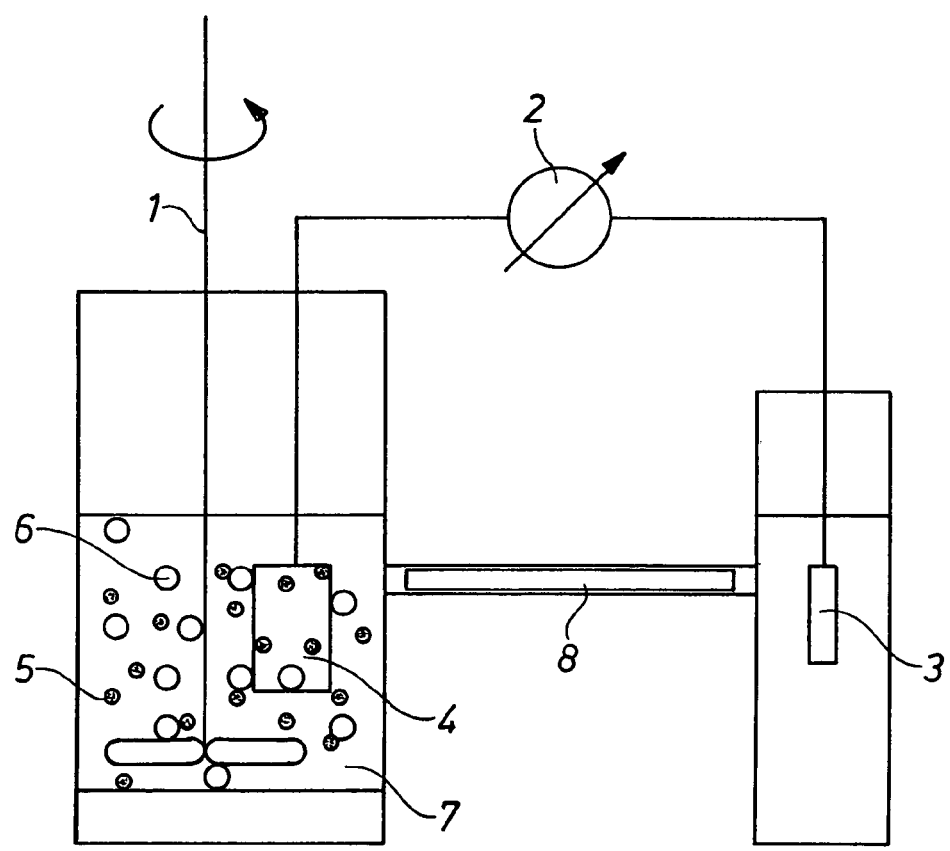
FIG. 1 schematically depicts a measurement arrangement for implementing the method comprising a stirrer 1, voltmeter 2, reference electrode 3, pick-up electrode 4, partially leached Raney alloy 5, hydrogen 6 and the aqueous solution 7 of $K_2SO_4$

FIG. 1 schematically depicts the measuring arrangement for implementing the following example. The reaction vessel is equipped with a propeller stirrer 1 and, via a salt bridge 8, is linked to a reference electrode 3. About 1 g of an aluminium-nickel alloy 5 having an analytical volume composition of 72.5 wt % of Al, 24.3 wt % of Ni, 3.2 wt % of Fe (manufactured by H. C. Starck, Goslar, Germany) are introduced as the initial charge at room temperature in 50 ml of 0.5 molar $K_2SO_4$ solution (as the conducting salt). The solution is admixed, with stirring, with 10 ml of a 1 molar NaOH solution, and the change in potential over time is determined. To this end there is immersed into this solution 7 a pure gold sheet 4 (manufactured by Alfa Aesar, Karlsruhe, Germany) having a surface area of about 1 $cm^2$ as the pick-up electrode 4, to which a gold wire having a thickness of 0.5 mm (supplied by ABCR, Karlsruhe, Germany) had been attached electroconductively. Via the wire, the gold sheet is connected to the potentiometer 2 which measures the voltage between gold sheet 4 (pick-up electrode PE) and a reference electrode 3 (Calomel electrode in 1 molar aqueous KCl, type 133410, batch 0235 from Schott, Mainz, Germany, RE). The reference electrode 3 is connected to the leaching reactor via a salt bridge 8 filled with 1 molar aqueous KCl solution. After about 2, 11, 21, 31 and 53 minutes, a few mg of this suspension are drawn off by means of a pipette and are rapidly washed on a nutsche filter until the pH is neutral. Then, by means of X-ray photoelectron spectroscopy (ESCA) the nickel and aluminium content of the samples drawn is determined.

Figure 2:
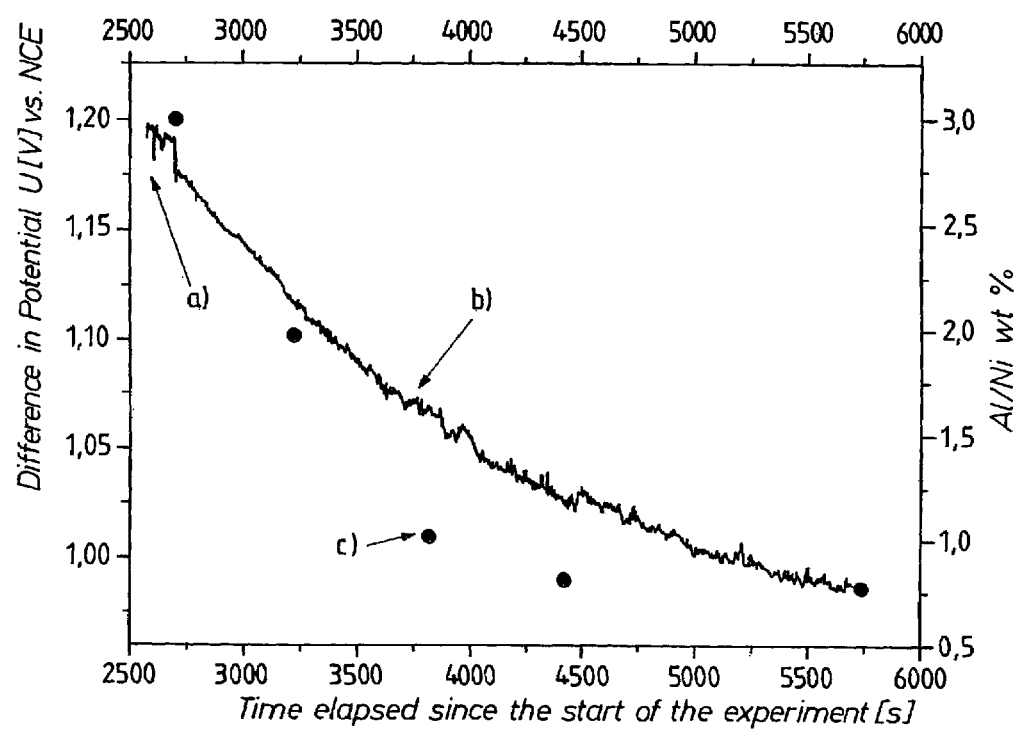
FIG. 2 shows how the potential of the pick-up electrode against the reference electrode together with the Al/Ni ratio (in wt %) on the surface of the material formed depends on the progress of leaching.
   a) Start of leaching, b) change over time of the difference in potential of the pick-up electrode against the reference electrode, c) Al/Ni ratio in wt %

FIG. 2 shows the potential of the PE against the RE together with the Al/Ni ratio (in wt %) as a function of the progress of leaching. The measured difference in potential qualitatively represents the course of leaching over time, so that, by determining a calibration curve, the current Al/Ni ratio of the active catalysts particles is obtained by a simple measurement of the difference in potential.

The measured difference in potential (FIG. 2, black line b)) between the pick-up electrode and the reference electrode decreases from the start of leaching a) as leaching time increases. At the same time, the composition of the catalyst changes in that the Al/Ni ratio (in wt %) changes, as shown by the black points (c). This ratio was obtained by measuring the composition of samples which were drawn from the solution, and washed, at the respective times.

It should be understood that the preceding is merely a detailed description of only a few embodiments of this invention and that numerous changes to the disclosed embodiments can be made in accordance with the disclosure herein without departing from the spirit or scope of the invention. The preceding description, therefore, is not meant to limit the scope of the invention.

Rather, the scope of the invention is to be determined only by the appended claims and their equivalents.

The invention claimed is:

1. Method of treating aluminium-metal alloys with organic or inorganic bases, said method comprising subjecting a starting aluminium-metal alloy to a leaching process comprising exposing a reaction mixture comprising dispersed particles of the starting alloy to an aqueous solution of an organic or inorganic base in a reactor, optionally under an inert gas atmosphere, to produce a treated alloy material, removing the aqueous base and washing the treated alloy material, wherein during a time that the starting alloy is exposed to the base the leaching process is monitored for a difference in potential between a measuring electrode (pick-up electrode), which is immersed in the solution, and a reference electrode and the process is terminated when a specified difference in potential is reached, and wherein the reaction mixture is stirred during the leaching process to bring the alloy particles into frequent contact with the pick-up electrode in order to change the potential of the pick-up electrode in the direction of equalization with the potential of the alloy particles.

2. Method according to claim 1, wherein the base is an alkali metal carbonate or an alkali metal hydroxide.

3. Method according to claim 2, wherein the base is sodium hydroxide or potassium hydroxide.

4. Method according to claim 1, wherein the reference electrode is connected electroconductively to the reactor solution and is located outside the reactor and supplies a potential which is constant over time.

5. Method according to claim 4, wherein the reference electrode is an electrode of a second type.

6. Method according to claim 1, wherein the measuring electrode is made of a chemically inert metal.

7. Method according to claim 6, wherein the measuring electrode is made of gold.

8. Method according to claim 1, wherein the pick-up electrode is in the form of a sheet, mesh or wire.

9. Method according to claim 8, wherein a surface area of the pick-up electrode covered by the solution is at least 10 times greater than the mean surface area of the alloy particles.

10. Method according to claim 9, wherein a surface area of the pick-up electrode covered by the solution is at least 100 times greater than the mean surface area of the alloy particles.

11. Method according to claim 1, wherein the reaction mixture is stirred during the leaching process.

12. Method according to claim 11, wherein the pick-up electrode is disposed transversely to a principal flow direction of the solution in the reactor.

13. Method according to claim 1, wherein the metal of the aluminium-metal alloy is selected from the group consisting of nickel, copper, and cobalt, the metal being present alone or in a mixture.

14. Method according to claim 1, wherein the ratio of the proportions by weight of aluminium to metal in the starting alloy is from 50:50 to 20:80.

15. Method according to claim 1, wherein the proportion by weight of aluminium in the starting alloy is from 5 to 95 wt %.

16. Method according to claim 15, wherein the proportion by weight of aluminium in the starting alloy is from 15 to 80 wt %.

17. Method according to claim 1, wherein the starting alloy comprises as a minor component a metal selected from the group consisting of iron, cerium, vanadium, niobium, tantalum, chromium, molybdenum and manganese, the metal being present alone or in a mixture.

18. Method according to claim 1, wherein a time of exposure of the starting alloy to the base is in a range from a number of seconds up to a number of days.

19. Method according to claim 18, wherein a time of exposure of the starting alloy to the base is in a range from 10 minutes to 2 hours.

* * * * *